US006349243B1

(12) United States Patent
Takagi

(10) Patent No.: US 6,349,243 B1
(45) Date of Patent: Feb. 19, 2002

(54) PRINTING APPARATUS, DELIVERING METHOD, PRINT SYSTEM, AND MEMORY MEDIUM

(75) Inventor: Atsushi Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,965

(22) Filed: Sep. 10, 1999

(30) Foreign Application Priority Data

Sep. 16, 1998 (JP) .......................................... 10-279331

(51) Int. Cl.7 ................................................ G06F 7/00

(52) U.S. Cl. ...................... 700/223; 700/224; 700/225; 700/229

(58) Field of Search ................................ 700/223, 224, 700/225, 228

(56) References Cited

U.S. PATENT DOCUMENTS 4,522,486 A * 6/1985 Clark et al. .................... 355/14
5,358,238 A * 10/1994 Mandel et al. .............. 271/298
5,390,910 A * 2/1995 Mandel et al. .............. 271/296
5,513,013 A * 4/1996 Kuo ........................... 358/448
5,546,577 A * 8/1996 Marlin et al. ............... 395/600
5,555,100 A * 9/1996 Bloomfield et al. ........ 358/402
5,758,074 A * 5/1998 Marlin et al. ............ 395/200.8
5,768,483 A * 6/1998 Maniwa et al. ............. 395/114
5,777,882 A * 7/1998 Salgado ................. 364/478.02
5,778,377 A * 7/1998 Marlin et al. ............... 707/103
5,898,592 A * 4/1999 Salgado et al. ........ 364/478.02
6,049,391 A * 4/2000 Farrell ....................... 358/1.15

* cited by examiner

*Primary Examiner*—Christopher P. Ellis
*Assistant Examiner*—Michael E. Butler
(74) *Attorney, Agent, or Firm*—Fitzpatrick, Cella, Harper & Scinto

(57) ABSTRACT

A printing apparatus for delivering a recording medium printed in accordance with received print information to a delivery tray which physically exists is constructed by a print information storing unit for storing the received print information, a delivery tray defining unit for virtually defining a delivery tray of the recording medium according to the stored print information, a delivery tray allocating unit for allocating the virtually defined delivery tray to the physically existing delivery tray and a delivering unit for delivering the printed recording medium to the allocated physically existing delivery tray. A delivering method, a print system, and a memory medium for realizing the above printing apparatus are also provided.

11 Claims, 10 Drawing Sheets

PRINTING APPARATUS, DELIVERING METHOD, PRINT SYSTEM, AND MEMORY MEDIUM

BACKGROUND OF THE INVENTION

1. Field of the Invention

The invention relates to a printing apparatus having a paper handling function such as sorter, sheet post-processing apparatus (finisher), or the like, a delivering method, a print system, and a memory medium.

2. Related Background Art

In recent years, in many cases, personal computers and workstations are connected by a local area network (LAN). In association with it, a printing apparatus (printer) is also directly connected to the LAN and often used in common by a plurality of host computers and a plurality of users in an office.

Under such an environment, print information transmitted to the printer used in common by the users is temporarily stored into the printer (spooler) and a printing process can be performed even while print information is being received from another host computer and user.

At this time, the user can define an individual paper handling function (sorter, finisher) with respect to each print information. As a paper handling function, a collation, a mail box, a group sort, and the like can be supported. The "collation" is a function for aligning pages every copy and outputting them when a plurality of copy pages are printed. The "mail box" is a function to allocate a specific delivery tray (bin) to an arbitrary dedicated user/group. The "group sort" is a function to output the copies of one page (as many as a plurality of copy pages) to each delivery tray (bin) when a plurality of copy pages are printed.

In the conventional printer, however, it is necessary to make the delivery tray as a paper handling function held by each print information (job) and delivery trays which physically exist correspond in a one-to-one relational manner.

If the virtual delivery tray held by each print information does not physically exist, a delivery tray on the delivery destination side has to depend on an error process of the printer. As mentioned above, hitherto, there is a problem such that the delivery tray cannot be designated when the delivery tray designated by the job does not physically exist.

SUMMARY OF THE INVENTION

The invention, therefore, is made to solve the above problems and it is an object of the invention to provide a printing apparatus, a delivering method, a print system, and a memory medium, in which even if print information designates a delivery tray (bin) which does not physically exist, the user can be allowed to perform a process for making the designated delivery tray (bin) correspond to a delivery tray (bin) which actually exists.

Another object of the invention is to provide a printing apparatus, a delivering method, a print system, and a memory medium, in which by allowing delivery trays as a paper handling function to be seen as if the number of them was larger than that of the delivery trays which actually exist, even if a job designates the delivery tray which does not physically exist, the occurrence of an error can be prevented.

Still another object of the invention is to provide a printing apparatus, a delivering method, a print system, and a memory medium, in which set contents and a setting state of a present delivery tray are displayed on the side of a panel or a host computer, thereby notifying the user of the set contents of a present paper handling and where and how the papers have been set, and a deletion or a copy is enabled to be designated in response to a job stored in each delivery tray, thereby realizing more variable paper handling.

To accomplish the above objects, according to the invention, there is provided a printing apparatus for delivering a recording medium printed in accordance with received print information to a delivery tray which physically exists, comprising: print information storing means for storing the received print information; delivery tray defining means for virtually defining a delivery tray of the recording medium according to the stored print information; delivery tray allocating means for allocating the virtually defined delivery tray to the physically existing delivery tray; and delivering means for delivering the printed recording medium to the allocated physically existing delivery tray.

Preferably, the printing apparatus receives the print information from a host computer and the host computer has display means for displaying the allocation of the physically existing delivery tray for the virtually defined delivery tray.

Preferably, in the printing apparatus, the display means displays a storing state of the recording medium in the virtually defined delivery tray.

Preferably, the display means displays information regarding the print information of the recording medium which has been stored in the virtually defined delivery tray.

Preferably, the host computer deletes and copies the print information for the stored print information.

Preferably, the physically existing delivery tray is a delivery tray of a paper handling function such as sorter, finisher, or the like.

According to the invention, there is provided a delivering method of delivering a recording medium printed by a printing apparatus in accordance with received print information to a delivery tray which physically exists, comprising the steps of: virtually defining a delivery tray of the recording medium according to the print information; and allocating the virtually defined delivery tray to the physically existing delivery tray.

According to the invention, there is provided a print system which has a host computer and a printing apparatus and delivers a recording medium printed by the printing apparatus in accordance with print information received from the host computer to a delivery tray which physically exists, comprising: print information storing means for storing the print information received from the host computer; delivery tray defining means for virtually defining a delivery tray of the recording medium according to the stored print information; delivery tray allocating means for allocating the virtually defined delivery tray to the physically existing delivery tray; display means for displaying an allocation of the physically existing delivery tray for the virtually defined delivery tray; and delivering means for delivering the printed recording medium to the allocated physically existing delivery tray.

According to the invention, there is provided a memory medium which is provided in a print system having a host computer and a printing apparatus and which stores a program that is executed by a CPU in the print system and allocates a delivery tray of a recording medium printed by the printing apparatus in accordance with print information received from the host computer to a delivery tray which physically exists, wherein the program comprises the steps of: virtually defining a delivery tray of the recording medium according to the print information; and allocating the virtually defined delivery tray to the physically existing delivery tray.

According to the invention, when the recording medium printed in accordance with the received print information is delivered to the physically existing delivery tray, the received print information is stored by the print information storing means, the delivery tray of the recording medium according to the stored print information is virtually defined by the delivery tray defining means, the virtually defined delivery tray is allocated to the physically existing delivery tray by the delivery tray allocating means, and the printed recording medium is delivered to the allocated physically existing delivery tray by the delivering means. Therefore, even if the print information designates the delivery tray which does not physically exist, the user can be allowed to perform the process to make such a tray correspond to the delivery tray which actually exists. Therefore, even if the job designates the delivery tray which does not actually exist, print data can be printed without causing an error.

By allowing the delivery trays as a paper handling function to be seen as if the number of delivery trays was larger than the delivery trays which actually exist, even if the job designates the delivery tray which does not physically exist, the occurrence of an error can be prevented. Therefore, by using the virtual delivery tray, the delivery trays of a small number can be virtually seen as if there were a large number of delivery trays.

According to the invention, since the print information is received from the host computer and the host computer has the display means for displaying the allocation of the physically existing delivery tray for the virtually defined delivery tray, the set contents and state of the present delivery tray are displayed on the host computer side, thereby notifying the user of the set contents of the present paper handling and where and how the paper has been set. The deletion and copy are enabled to be designated for the job stored in each delivery tray. Thus, the more variable paper handling can be realized.

As mentioned above, the contents of a bin mapping table and where and how the paper has been set are displayed on the host computer side via the network, thereby making it possible to notify the user of the state of the virtual delivery tray.

According to the invention, since the display means displays the storing state in the recording medium of the virtually defined delivery tray, effects similar to those in the foregoing printing apparatus can be obtained and the user can designate the delivery tray while visually confirming.

According to the invention, since the display means displays the information regarding the print information of the recording medium stored in the virtually defined delivery tray, the operability on the host computer by the user can be raised.

According to the invention, since the host computer deletes and copies the print information for the stored print information, the print information can be easily edited.

According to the invention, since the physically existing delivery tray is the delivery tray of the paper handling function such as sorter, finisher, or the like, it is possible to cope with various paper handling functions.

According to the invention, there is provided a memory medium which is provided in a print system having a host computer and a printing apparatus and which stores a program that is executed by a CPU in the print system and allocates a delivery tray of a recording medium printed by the printing apparatus in accordance with print information received from the host computer to a delivery tray which physically exists, wherein the program comprises the steps of: virtually defining a delivery tray of the recording medium according to the print information; and allocating the virtually defined delivery tray to the physically existing delivery tray. Therefore, the generality and expandability of the print system can be improved.

DETAILED DESCRIPTION OF THE PREFERRED EMBODIMENT

A preferred embodiment of the invention will now be described in detail hereinbelow with reference to the drawings.

Figure 1:
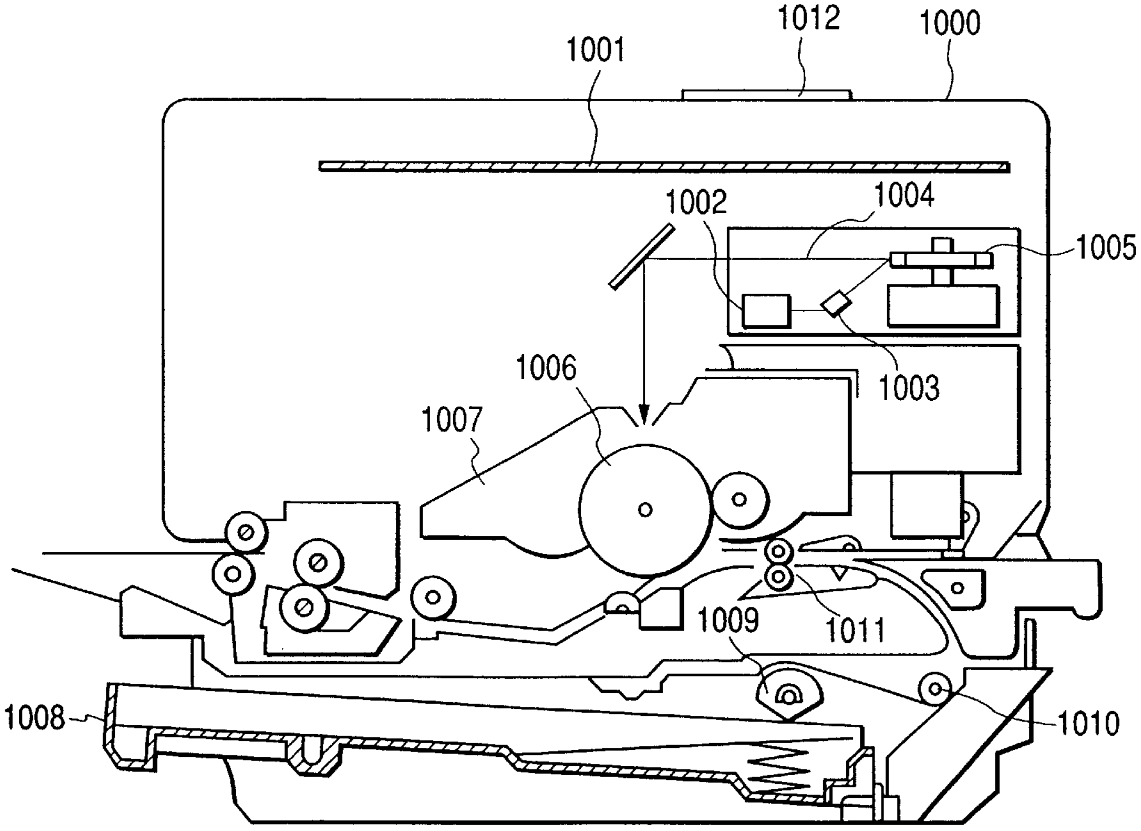
FIG. 1 is a cross sectional view showing a construction of a laser beam printer according to an embodiment.

FIG. 1 is a cross sectional view showing a construction of a laser beam printer according to the embodiment.

In the diagram, reference numeral 1000 denotes an LBP main unit for inputting and storing print information (character codes or the like), form information, macro commands, and the like (they are also generally referred to as print information) which are supplied from a host computer which is connected to an outside, forming corresponding character pattern, form pattern, or the like in accordance with those information, and forming an image onto a recording paper or the like as a recording medium.

Reference numeral 1012 denotes an operation panel on which operation switches, an LED display, and the like are arranged. Reference numeral 1001 denotes a printer control unit to perform a whole control of the LBP main unit 1000 and analyze the print information or the like supplied from the host computer. The printer control unit 1001 mainly converts character information into a video signal of the corresponding character pattern and outputs it to a laser driver 1002.

The laser driver 1002 is a circuit to drive a semiconductor laser 1003 and switches the on/off states of a laser beam 1004 which is emitted from the semiconductor laser 1003 in accordance with the inputted video signal. The laser beam 1004 is swung to the right and left by a rotary polygon mirror 1005 and exposes an electrostatic drum 1006 while scanning thereon.

Thus, an electrostatic latent image of the character pattern is formed on the electrostatic drum 1006. The electrostatic latent image is developed by a developing unit 1007 arranged around the electrostatic drum 1006 and is, thereafter, transferred onto the recording paper. Cut sheet recording papers are used as recording papers. The cut sheet recording papers are enclosed in a paper cassette 1008 attached in the LBP main unit 1000, fetched one by one into the apparatus by a feed roller 1009 and conveying rollers 1010 and 1011, and supplied to the electrostatic drum 1006.

At least one card slot is formed in the LBP main unit 1000 and an option font card, a control card (emulation card) of a different language system, or the like besides built-in fonts is connected to the card slot.

Figure 2:
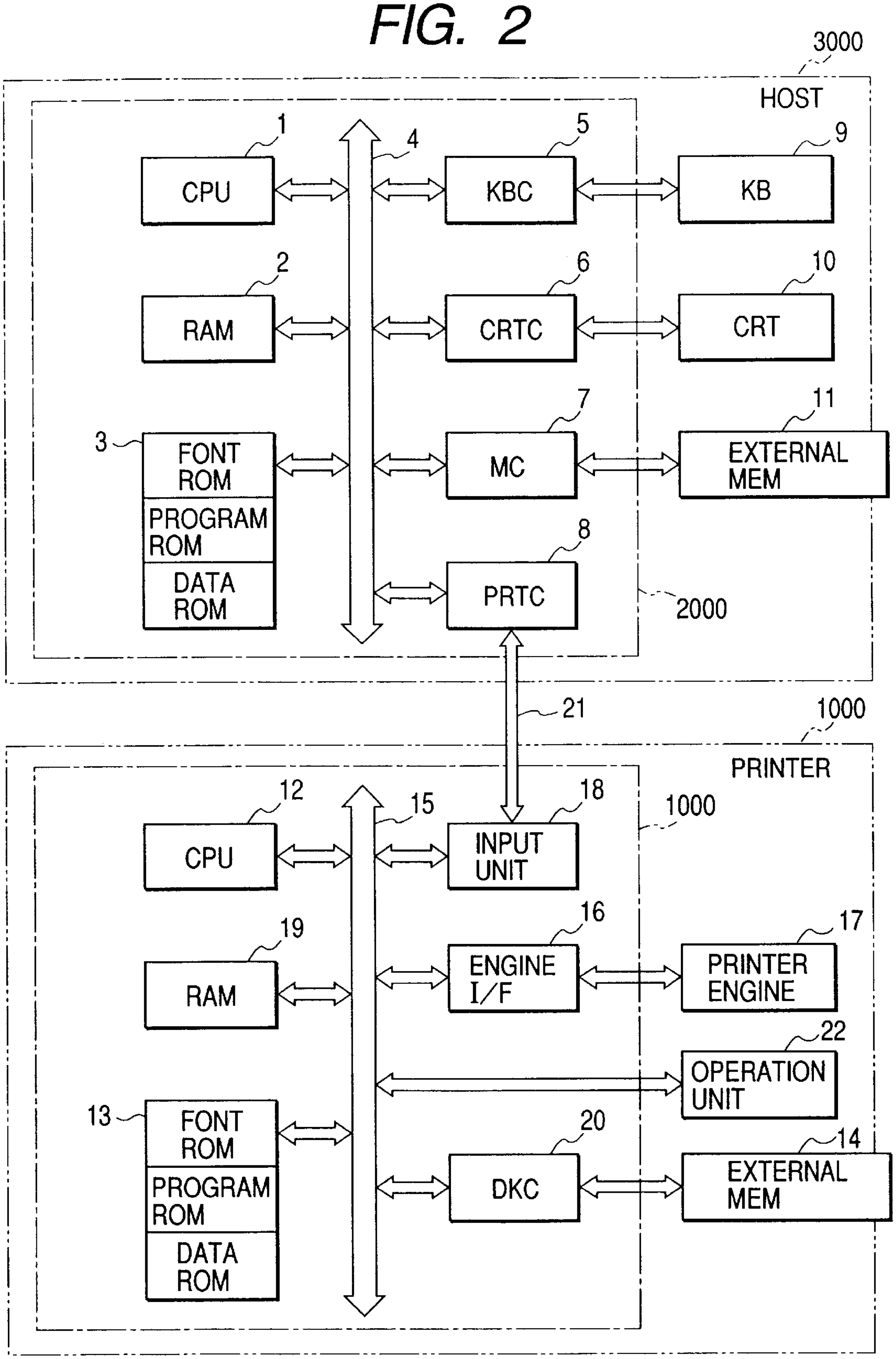
FIG. 2 is a block diagram showing a construction of a printer control system having the laser beam printer of FIG. 1.

FIG. 2 is a block diagram showing a construction of a printer control system having the laser beam printer of FIG. 1. In the diagram, reference numeral 3000 denotes a host computer constructed mainly by a CPU 1.

The CPU 1 executes a document process of a document in which a figure, an image, characters, a table (including a spreadsheet and the like), and the like mixedly exist on the basis of a document processing program or the like stored in a program ROM in an ROM 3 and integratedly controls devices connected to a system bus 4.

A control program and the like which are executed by the CPU 1 are stored into a program ROM of the ROM 3. Font data and the like which are used at the time of the document process are stored into a font ROM of the ROM 3. Various data which is used when the document process or the like is performed is stored into a data ROM of the ROM 3.

Reference numeral 2 denotes an RAM which functions as a main memory, a work area, or the like of the CPU 1; 5 a keyboard controller (KBC) for controlling a key input from a keyboard (KB) 9 or a pointing device (not shown); 6 a CRT controller (CRTC) for controlling a display of a display (CRT) 10; and 7 a memory controller (MC) for controlling an access with an external memory 11 such as hard disk (HD), floppy disk (FD), or the like to store a boot program, various applications, font data, a user file, an edit file, and the like.

Reference numeral 8 denotes a printer controller (PRTC) which is connected to the LBP main unit (printer) 1000 through a bidirectional interface (interface) 21 and executes a communication control process with the printer 1000.

In a host computer having the above construction, the CPU 1 executes a developing (rasterizing) process of outline fonts into a display information area set in the RAM 2, thereby enabling WYSIWYG on the CRT 10 to be performed. The CPU 1 opens various registered windows on the basis of commands instructed by a mouse cursor or the like on the CRT 10 and executes various data processes.

In the printer 1000, reference numeral 12 denotes a CPU for integratedly controlling accesses with the various devices connected to a system bus 15 on the basis of the control program stored in the program ROM in an ROM 13 or a control program stored in an external memory (hard disk) 14 and outputting an image signal as output information to a printing unit (printer engine) 17 connected through a printing unit interface (engine interface) 16.

Control programs shown by flowcharts of FIGS. 7 and 8, which will be explained hereinlater, have been stored in the program ROM of the ROM 13 and are executed by the CPU 12. The font data and the like which are used when output information is generated are stored in the font ROM of the ROM 13. Information which is used by the host computer 3000 is stored in the data ROM of the ROM 13 in case of a printer without the external memory 14 such as a hard disk.

The CPU 12 can communicate with the host computer 3000 through an input unit 18 and notifies the host computer 3000 of information in the printer 1000.

Reference numeral 19 denotes an RAM which functions as a main memory, a work area, or the like of the CPU 12 and can expand a memory capacity by an option RAM which is connected to an expansion port (not shown). The RAM 19 is used as an output information developing area, an environment data storing area, an NVRAM, or the like. The access to the external memory 14 such as hard disk (HD), IC card, or the like is controlled by a memory controller (MC) 20. The external memory 14 is connected as an option and stores font data, an emulation program, form data, and the like.

The input unit 18 performs an inputting process from the host computer 3000. Reference numeral 22 denotes an operation unit for performing inputting and outputting processes with the operation switches and LED display arranged on the operation panel 1012 mentioned above.

The external memory is not limited to one memory but a plurality of memories can be used. An option font card or a memory in which a program to interpret a printer control language of a different language system has been stored can be used in place of the built-in fonts. Further, it is also possible to have an NVRAM (not shown) and store printer mode set information from the operation panel 1012.

Figure 3:
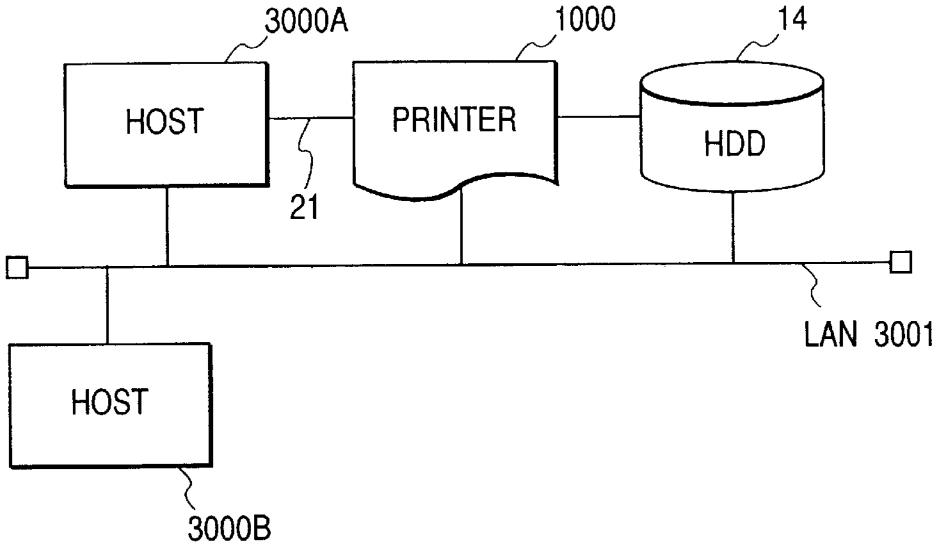
FIG. 3 is a diagram showing a construction of the printer control system to which host computers and a printer are individually connected through a network.

The operation of the printer control system having the above construction will now be described. FIG. 3 is a diagram showing a construction of the printer control system to which host computers and a printer are individually connected through a network. Each of the printer 1000 and a plurality of host computers 3000A and 3000B has a network interface (not shown) and is connected to an LAN 3001. The printer 1000 is connected to the host computer 3000A through the bidirectional interface 21 as shown in FIG. 2 mentioned above. Print information (jobs) transmitted from the host computers 3000A and 3000B is stored onto the hard disk 14 through the LAN 3001.

Figure 4:
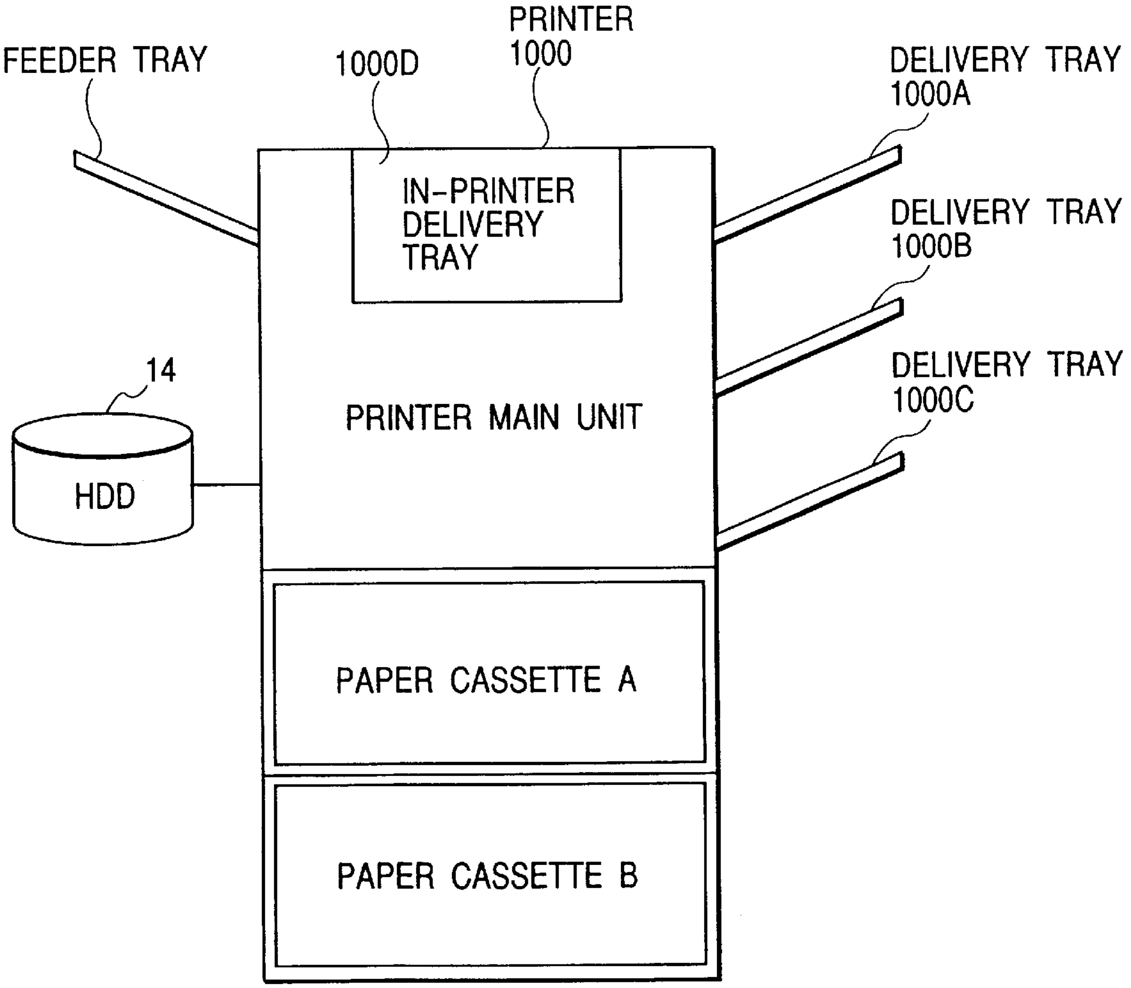
FIG. 4 is a diagram schematically showing delivery trays as a paper handling function of the printer.

FIG. 4 is a diagram schematically showing delivery trays (bins) of the paper handling function of the printer. The printer 1000 has delivery trays 1000A, 1000B, and 1000C of the paper handling function, an in-printer delivery tray 1000D provided in the upper portion of the main unit, the hard disk (external memory) 14, and the like.

Figure 5:
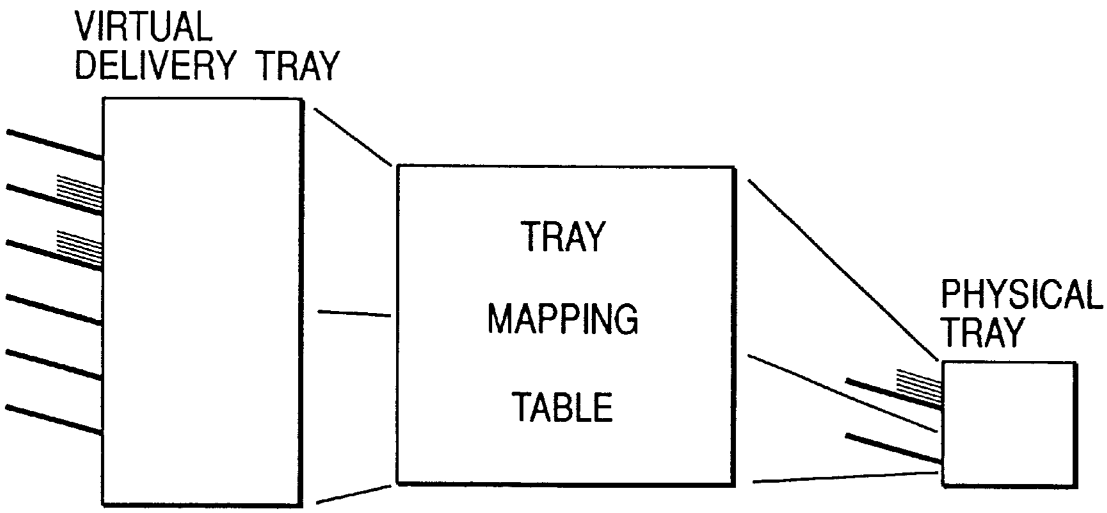
FIG. 5 is a diagram showing a state where virtual delivery trays are replaced by physical delivery trays by a tray mapping table.

A tray mapping table (refer to FIGS. 11A and 11B) has been stored in the hard disk 14. When a virtual delivery tray is designated as an output destination by the print information (job) (not shown), the designated virtual delivery tray is replaced to the physical delivery tray by the tray mapping table. FIG. 5 is a diagram showing a state where the virtual delivery tray is replaced to the physical delivery tray by the tray mapping table. The number of virtual delivery trays is not limited to a fixed value but can be changed to an arbitrary number and can be set to a value that is larger or smaller than the number of physical delivery trays.

Figure 6:
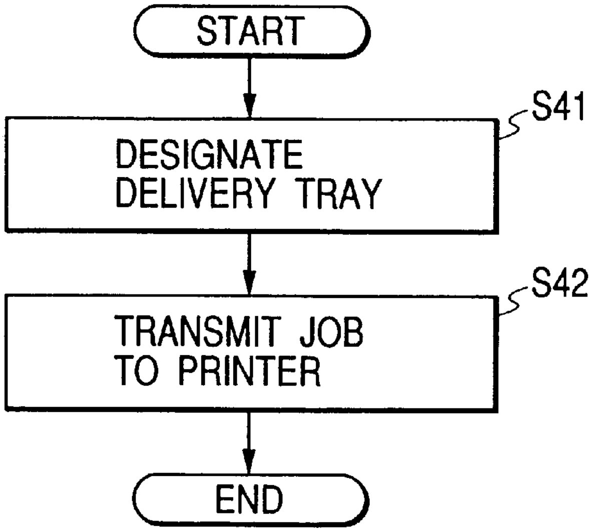
FIG. 6 is a flowchart showing an operation processing procedure of a host computer 3000.

FIG. 6 is a flowchart showing an operation processing procedure of the host computer 3000. The control program to realize the operating process shown by the flowchart has been stored in the ROM 3 and is executed by the CPU 1. The control program can be stored into the external memory (hard disk) 11 in place of the ROM 3.

In case of executing the printing by the host computer 3000, a delivery destination (delivery tray) is first designated (step S41). A job (print information) is sent to the printer 1000 through the bidirectional interface 21 (step S42). The processing routine is finished.

The delivery tray which is designated in step S41 does not always need to correspond to the delivery tray physically attached to the printer 1000. More specifically speaking, in a state where three delivery trays are physically attached, the printer 1000 can designate the fourth delivery tray as an output destination in step S41. In the extreme case, the delivery tray can be designated as an output tray even in the case where no delivery tray is attached to the printer 1000.

Figure 7:
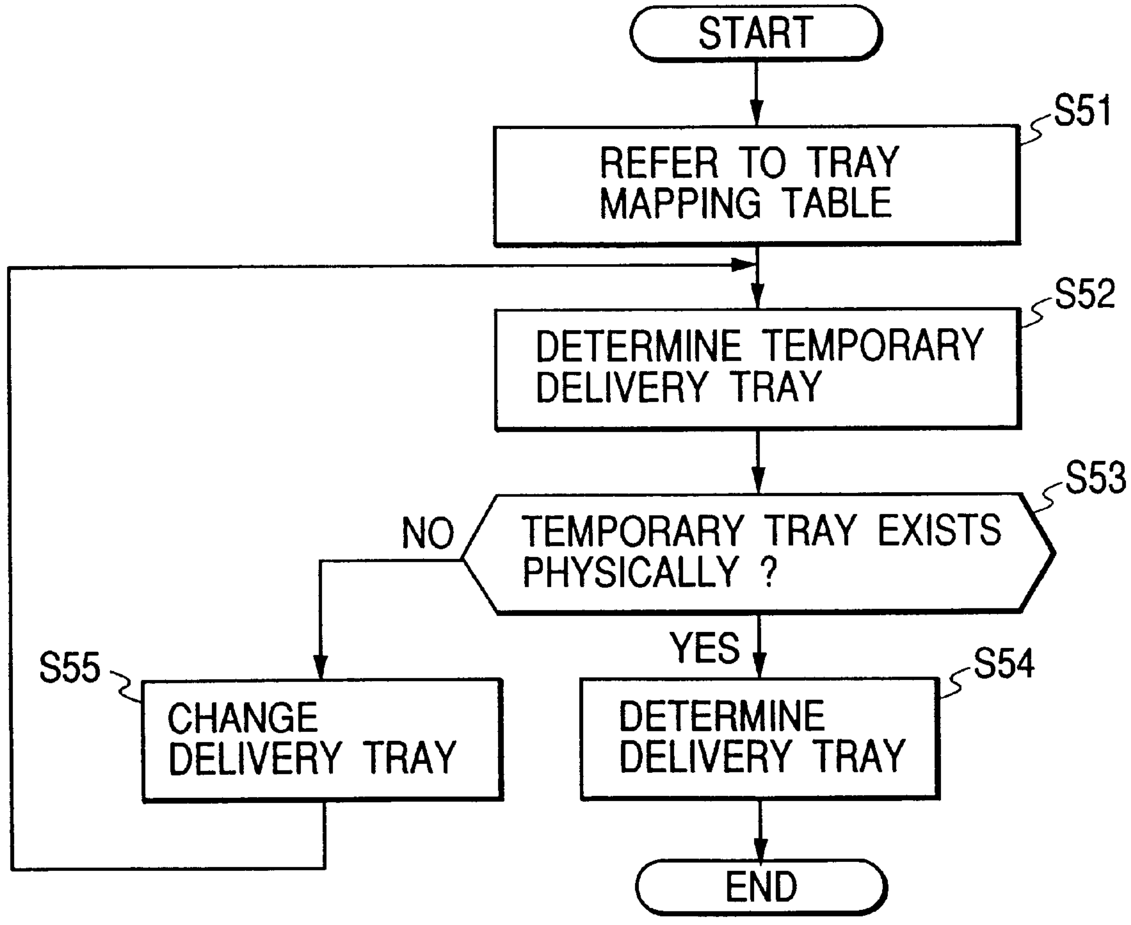
FIG. 7 is a flowchart showing a processing procedure to decide a delivery tray of a job when a printing process is performed by a printer 1000.

FIG. 7 is a flowchart showing a processing procedure to decide the delivery tray of the job when the printing process is performed by the printer 1000. The processing program has been stored in the program ROM of the ROM 13 in the printer 1000 and is executed by the CPU 12.

The delivery tray of the job designated by the process in step S41 on the host computer 3000 side is handled (defined) as a virtual tray on the printer 1000 side.

The physical delivery tray is temporarily determined (step S52) on the basis of the virtual tray designated as a delivery tray with reference to the tray mapping table (step S51).

Whether the delivery tray temporarily determined in step S52 physically exists or not is discriminated (step S53). If it exists, the delivery tray is formally determined (step S54) and the processing routine is finished. If NO, the delivery tray is changed (step S55) and the processes in steps S52, S53, and S55 are repeated until the delivery tray is formally determined.

Figure 8:
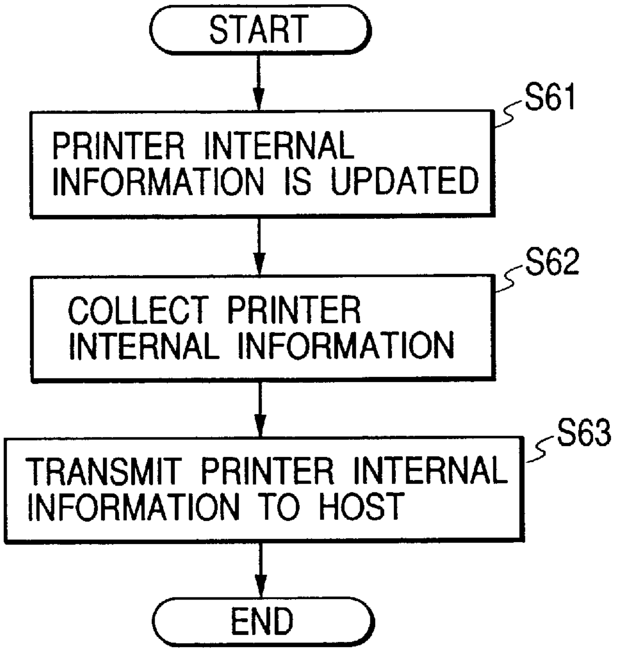
FIG. 8 is a flowchart showing a processing procedure for transmitting internal information to the host computer 3000 when the internal information (a mapping state or where and how a paper has been set or the like) of the printer 1000 changes.

FIG. 8 is a flowchart showing a processing procedure for transmitting the internal information to the host computer 3000 when the internal information (mapping state, where and how the paper has been set, or the like) of the printer 1000 changes. The processing program has been stored in the program ROM of the ROM 13 in the printer 1000 and is executed by the CPU 12.

First, when the paper handling function (sorter, finisher) having the delivery trays 1000A to 1000C is installed to the printer 1000, the printer internal information is automatically updated (step S61). In this instance, the printer internal information is collected in the printer 1000 (step S62). The collected printer internal information is transmitted to the host computer 3000 via the LAN 3001 (step S63). In step S61, the recording paper is pulled out or inserted by the paper handling function or the printer internal information is updated even when the tray mapping table is changed.

Figure 9:
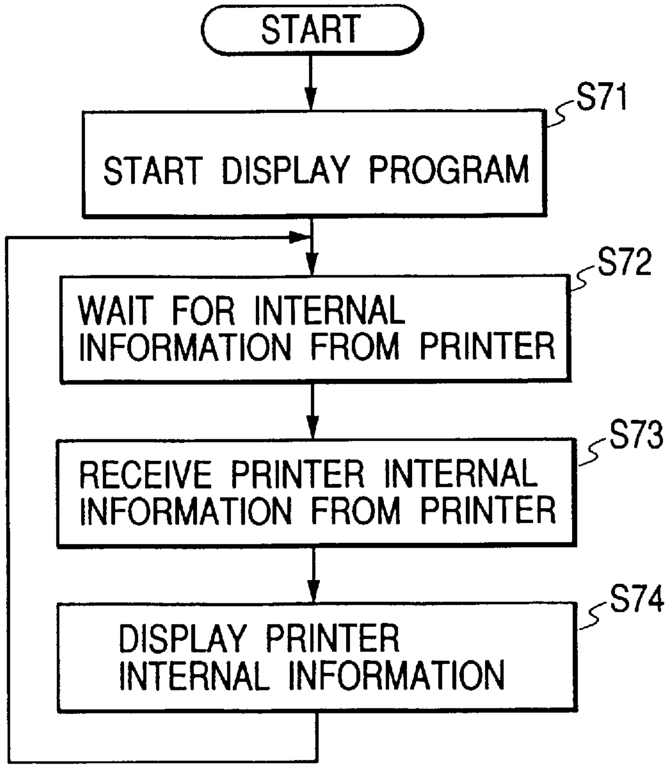
FIG. 9 is a flowchart showing a processing procedure to display printer internal information by the host computer 3000.

FIG. 9 is a flowchart showing a processing procedure for displaying the printer internal information by the host computer 3000. The processing program has been stored in the program ROM of the ROM 3 in the host computer 3000 and is executed by the CPU 1. First, the display program stored in the program ROM of the ROM 3 is started (step S71). The display program can be stored in the hard disk 11.

The apparatus enters a state (standby state) for waiting for reception of the internal information (data) from the printer 1000 (step S72). When the printer internal information transmitted by the process in step S63 is received from the printer 1000 (step S73), the received internal information is displayed (step S74). After that, the apparatus is returned to the standby state in step S72. The standby state is continued until the display program started in step S71 is finished. The display program can be finished by an instructing operation (not shown) by the user.

Figure 10:
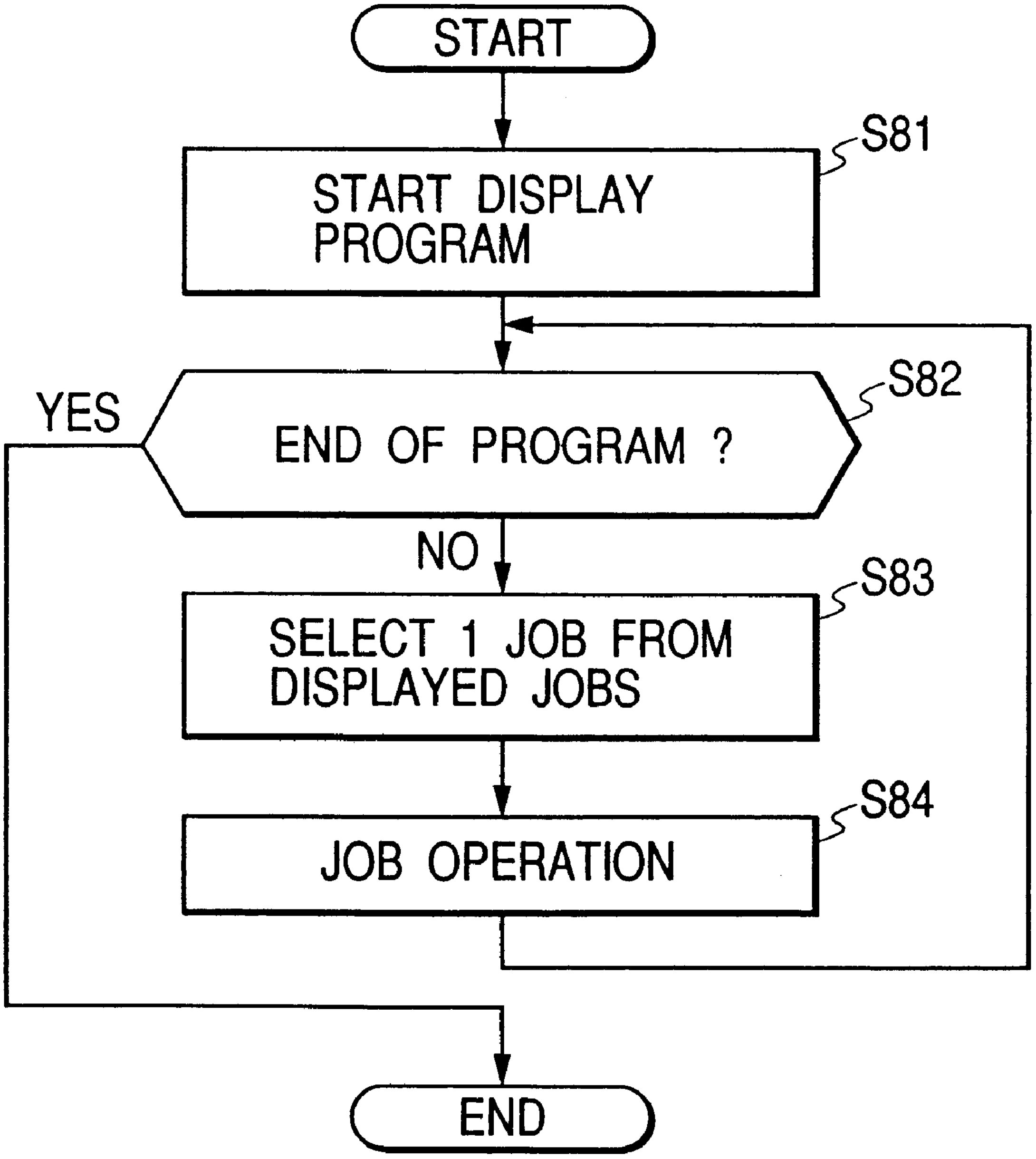
FIG. 10 is a flowchart showing a processing procedure to select a job and display its contents and delete and copy the job by the host computer 3000.

FIG. 10 is a flowchart showing a processing procedure for selecting the job and displaying its contents and deleting or copying the job by the host computer 3000. The processing program has been stored in the program ROM of the ROM 3 in the host computer 3000 and is executed by the CPU 1.

The display program is first started by the host computer 3000 (step S81) and a list of jobs is displayed. The display program which is the same as or different from that used in FIG. 9 can be used as such a display program.

Whether the program has been finished or not is discriminated (step S82). If NO, an arbitrary job is selected from the displayed job list (step S83) and a job operation is designated (step S84). In the process in step S84, the job operation such as display of the contents of the job, copy of the job, deletion of the job, or the like can be designated on a page and tray unit basis. After that, the processing routine is returned to the process in step S82. Similar processes are repeated until the display program is finished. The display program can be finished by an instructing operation (not shown) by the user.

Figure 11A:
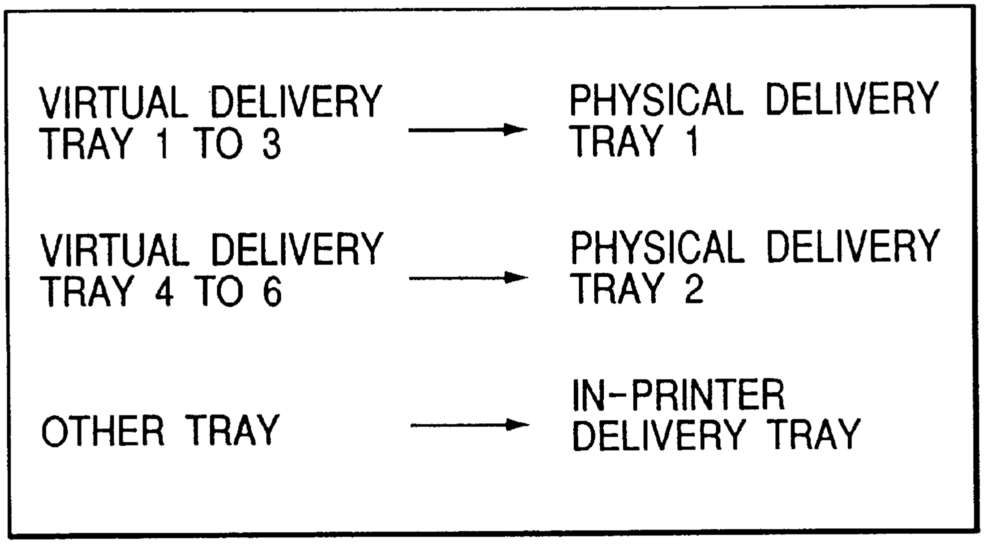
FIGS. 11A and 11B are diagrams showing tray mapping tables stored on a hard disk 14.
Figure 11B:
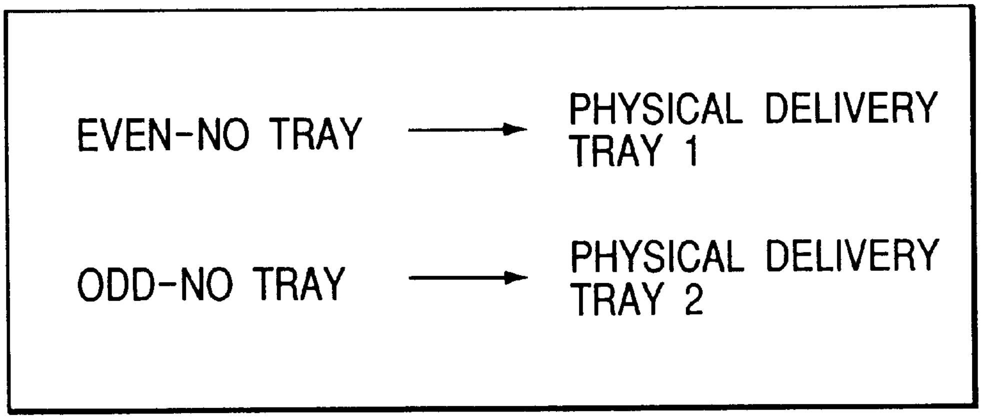

FIGS. 11A and 11B are diagrams showing a tray mapping table stored in the hard disk 14. When the tray mapping table in FIGS. 11A and 11B is edited, as shown in FIG. 11A, a range of the tray numbers of the virtual delivery trays can be designated and the virtual delivery trays within the designated range can be allocated to the physical delivery tray. As shown in FIG. 11B, the even-No. tray and odd-No. tray of the virtual delivery trays can be allocated to a physical delivery tray 1 and a physical delivery tray 2, respectively.

The tray mapping table can be edited from the operation panel (operation unit) 22. By printing the set contents by the operation panel, they can be visually confirmed as shown in FIGS. 11A and 11B. The, tray mapping table can be displayed and edited on the host computer side.

In case of taking out the trays, the trays can be sequentially taken out or a specific tray can be designated and taken out. The storing location of the tray mapping table is not limited to the external memory (hard disk) 14 but can be provided in the RAM 19.

Figure 12:
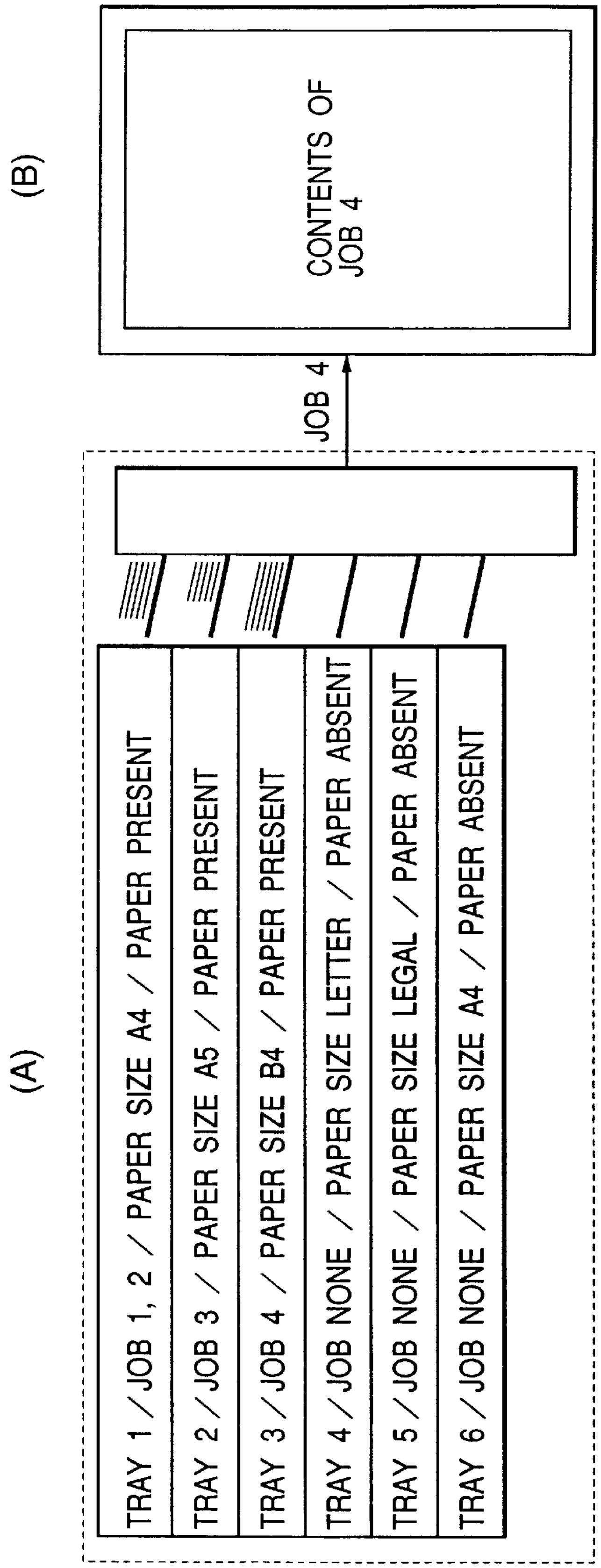
FIG. 12 is a diagram showing virtual trays which are displayed by a display program in the host computer 3000.

FIG. 12 is a diagram showing the virtual trays and the contents of the jobs which are displayed by the display program shown in FIGS. 9 and 10 of the host computer 3000. The contents of the virtual trays including spool information of the jobs, paper size information, and information regarding the presence or absence of the paper and the like can be displayed every tray by the display program of the host computer 3000 as shown in the left portion A. The job can be selected by the display program and its contents can be displayed on the screen as shown in the right portion B. Thus, the jobs can be deleted and copied on a page and tray unit basis.

As a paper handling function, in addition to the collation, mail box, and group sort, expanding functions such as insertion of the paper, folded paper, staple, and the like can be included.

Although the case of the laser beam printer has been shown in the embodiment, the invention can be similarly applied to an ink jet printer or a printer of another printing system.

Further, although the state and the like of the delivery trays shown in FIG. 12 have been displayed on the CRT 10 on the host computer side in the embodiment, they can be displayed on the operation panel on the printer side.

Furthermore, the invention can be similarly applied to any of a system comprising single equipment, a system comprising a plurality of equipment, and a system in which processes are executed through a network such as an LAN or the like so long as the functions of the invention are executed.

The invention, moreover, can be applied to the case where the functions of the invention are accomplished by supplying a program to a system or an apparatus. In this case, a memory medium in which program modules expressed by software to accomplish the invention have been stored is supplied to the system or apparatus and the program modules are read out of the memory medium and installed to the system or apparatus, so that the system or apparatus can obtain the effects of the invention.

Figure 13A:
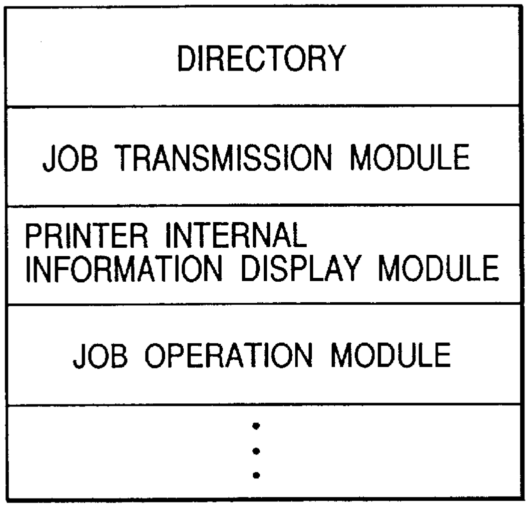
FIGS. 13A and 13B are diagrams showing memory maps in an ROM as a memory medium.
Figure 13B:
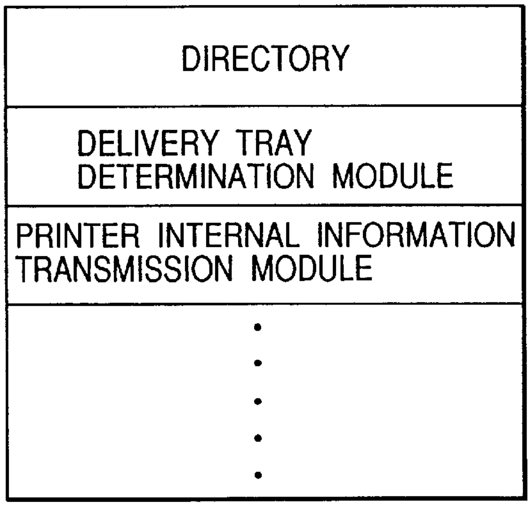

FIGS. 13A and 13B are diagrams showing memory maps in the ROMs provided as memory media in the host computer and the printer of the printer control system. As shown in FIG. 13A, the job transmission module shown in FIG. 6, the printer internal information display module shown in FIG. 9, and the job operation module shown in FIG. 10 have been stored in the ROM 3 in the host computer 3000. As shown in FIG. 13B, the delivery tray determination module shown in FIG. 7 and the printer internal information transmission module shown in FIG. 8 have been stored in the ROM 13 in the printer 1000.

In the job transmission module, the delivery tray is designated. In the delivery tray determination module, the delivery tray designated by the job transmission module is defined as a virtual delivery tray and, further, the defined virtual delivery tray is allocated to the physically existing delivery tray.

The exchangeable memory medium for supplying such program modules is not limited to the ROM. For example, any of a floppy disk, a hard disk, an optical disk, a magnetooptic disk, a CD-ROM, a CD-R, a DVD, a magnetic tape, a non-volatile memory card, and the like can be used.

What is claimed is:

1. A printing apparatus for delivering a recording medium printed in accordance with received print information to a delivery tray which physically exists, comprising:

print information storing means for storing said received print information;

delivery tray defining means for virtually defining a delivery tray of said recording medium according to said stored print information;

delivery tray allocating means for allocating at least two said virtually defined delivery trays to one said physically existing delivery tray; and delivering means for delivering said printed recording medium to said allocated physically existing delivery tray.

2. An apparatus according to claim 1, wherein said printing apparatus receives the print information from a host computer and the host computer has display means for displaying the allocation of said physically existing delivery tray for said virtually defined delivery tray.

3. An apparatus according to claim 1, wherein said apparatus is configured such that if no physically existing delivery tray corresponding to the virtually defined delivery tray exists, said delivery tray allocating means allocates at least two said virtually defined delivery trays to a physically existing delivery tray.

4. A delivery method of delivering a recording medium printed by a printing apparatus in accordance with received print information to a delivery tray which physically exists, comprising the steps of:

virtually defining a delivery tray of said recording medium according to said print information; and allocating at least two said virtually defined delivery trays to one said physically existing delivery tray.

5. A method according to claim 4, wherein if no physically existing delivery tray corresponding to the virtually defined delivery tray exists, said allocating step allocates at least two said virtually defined delivery trays to a physically existing delivery tray.

6. A print system comprising:

a host computer; and a printing apparatus which delivers a recording medium printed in accordance with print information received from said host computer to a delivery tray which physically exists, said printing apparatus comprising:

print information storing means for storing the print information received from said host computer;

delivery tray defining means for virtually defining a delivery tray of said recording medium according to said stored print information;

delivery tray allocating means for allocating at least two said virtually defined delivery trays to one said physically existing delivery tray; and delivering means for delivering said printed recording medium to said allocated physically existing delivery tray, wherein said host computer includes display means for displaying an allocation of said physically existing delivery tray for said virtually defined delivery tray.

7. A computer-readable memory medium which is provided in a printing control apparatus and which stores a program for delivering a recording medium printed by a printing engine apparatus in accordance with received print information to a delivery tray which physically exists, wherein said program comprises the steps of:

virtually defining a delivery tray of said recording medium according to said print information; and allocating at least two said virtually defined delivery trays to one said physically existing delivery tray.

8. A system according to claim 6, wherein said display means displays a storing state of said recording medium in said virtually defined delivery tray.

9. A system according to claim 6, wherein said display means displays information regarding the print information of said recording medium which has been stored in said virtually defined delivery tray.

10. A system according to claim 6, wherein said host computer deletes and copies said print information for said stored print information.

11. A system according to claim 6, wherein said physically existing delivery tray is a delivery tray of a paper handling function.

* * * * *

UNITED STATES PATENT AND TRADEMARK OFFICE
CERTIFICATE OF CORRECTION

PATENT NO. : 6,349,243 B1
DATED : February 19, 2002
INVENTOR(S) : Atsushi Takagi It is certified that error appears in the above-identified patent and that said Letters Patent is hereby corrected as shown below:

Column 8,
Line 40, "The," should read -- The --.

Signed and Sealed this

Seventh Day of May, 2002

Attest:

JAMES E. ROGAN

*Attesting Officer*

*Director of the United States Patent and Trademark Office*